Jan. 11, 1966  J. BROWN  3,228,190
GAS TURBINE PLANT
Filed Aug. 6, 1963  3 Sheets-Sheet 2

INVENTOR
JAMES BROWN
BY
Stevens, Davis, Miller + Mosher
ATTORNEYS

Jan. 11, 1966  J. BROWN  3,228,190
GAS TURBINE PLANT
Filed Aug. 6, 1963  3 Sheets-Sheet 3

INVENTOR
JAMES BROWN
BY
Stevens, Davis, Miller + Mosher
ATTORNEYS

3,228,190
GAS TURBINE PLANT
James Brown, Fleet, England, assignor to Power Jets (Research & Development) Limited, London, England, a British company
Filed Aug. 6, 1963, Ser. No. 300,243
Claims priority, application Great Britain, Aug. 16, 1962, 31,556/62
3 Claims. (Cl. 60—39.51)

The present invention relates to gas turbine plant.

According to the present invention a gas turbine plant includes an axial flow compressor, a diffuser to collect the whole of the compressor output, an annular first chamber arranged about the compressor axis to receive the compressor output collected by the diffuser, a second chamber, combustion means and a turbine assembly, the first chamber having an annular outlet which is arranged about the compressor axis and which permits a continuous flow of fluid to be delivered as an annular stream into the second chamber, and another outlet which is closeable.

Figure 1:
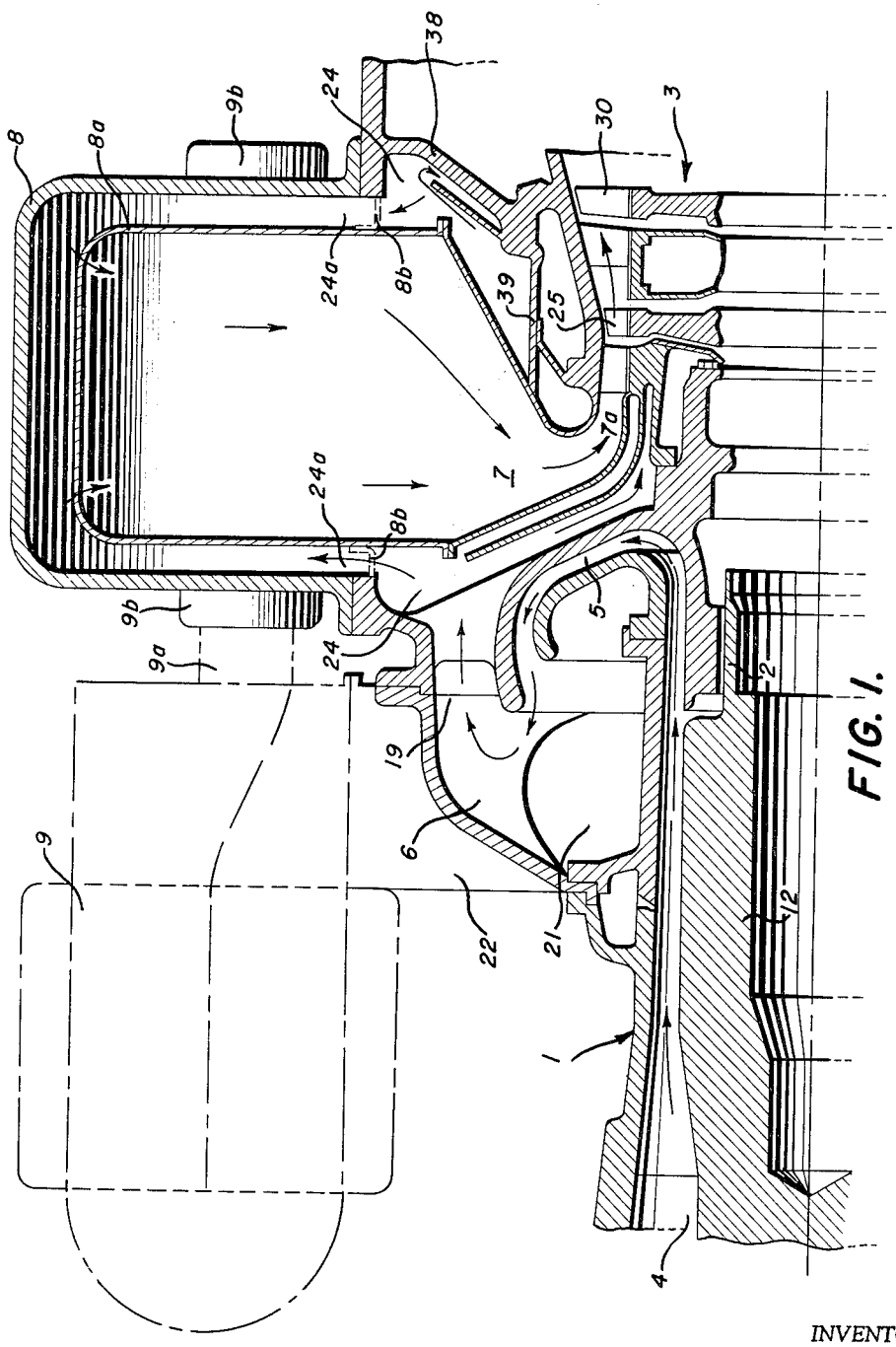
Figure 2:
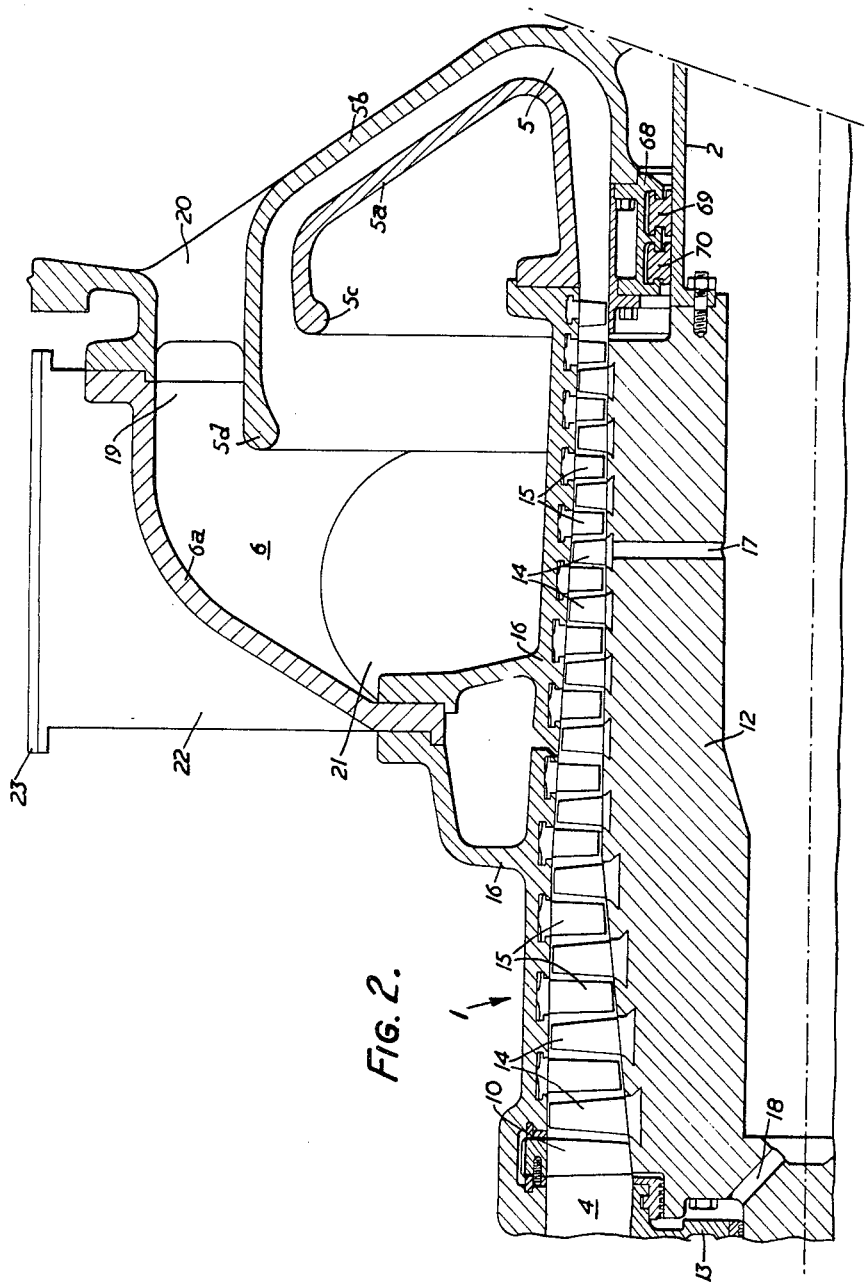
Figure 2A:
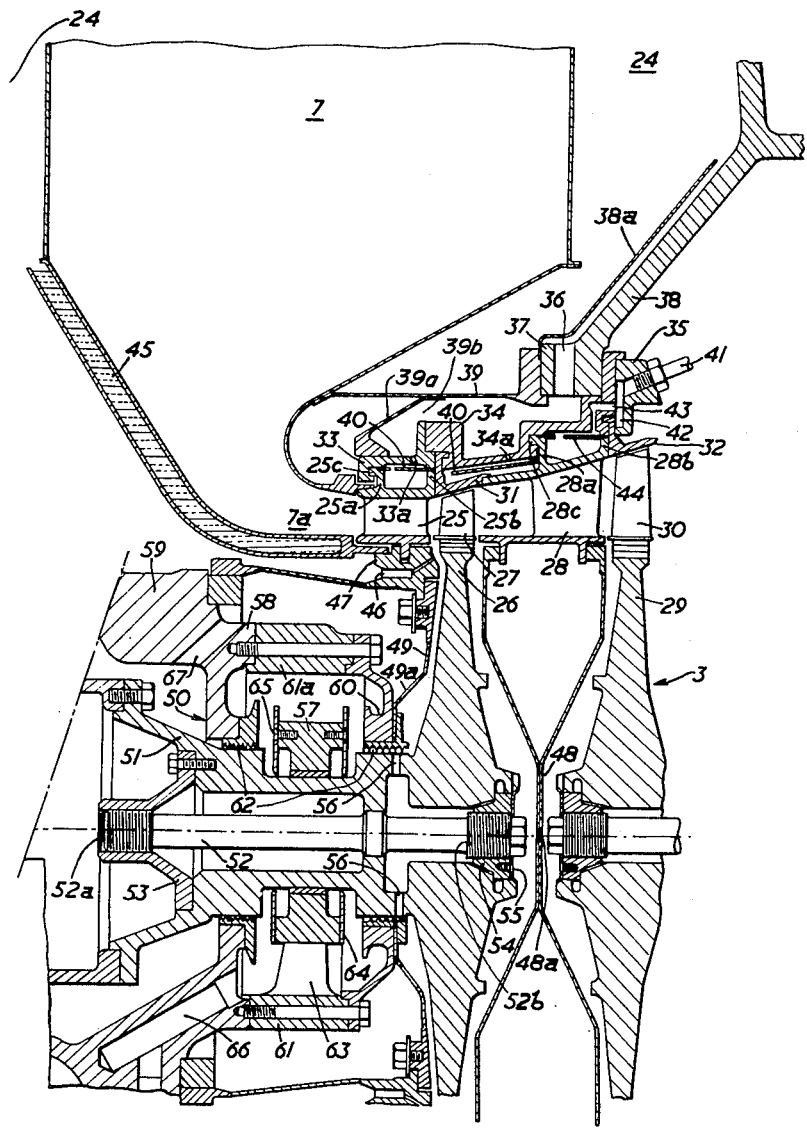

An embodiment of the present invention will now be described by way of example, reference being made to the accompanying diagrammatic drawings in which FIGURE 1 shows in longitudinal section, a part of a gas turbine plant and FIGURES 2 and 2A together show a part of the plant of FIGURE 1 in greater detail.

A multi-stage axial-flow compressor 1, driven through a hollow shaft 2 by a high-pressure axial-flow turbine of a turbine assembly 3, receives atmospheric air through an annular inlet 4 and delivers it under pressure to a diffuser 5. Air from the diffuser 5 is received in a collecting chamber 6 from which it passes to a combustion chamber 8 either directly or via a heat-exchanger 9 which is shown in dot-dash lines in FIGURE 1. The products of combustion are received in an annular turbine inlet volute 7 from which they pass to the compressor-driving turbine and then to a low-pressure axial-flow turbine before being exhausted to atmosphere either directly or via the heat-exchanger to heat the air on its way from the compressor 1 to the combustion chamber. The low-pressure turbine drives a power output shaft.

Adjustable guide blades 10 at the inlet 4 direct the air into the compressor 1 which includes a drum 12 mounted for rotation in a bearing in a housing 13 (only part of which is shown) at one end and secured to its driving shaft 2 at the other. A plurality of blades 14 are secured to the drum 12 in axially-spaced rings. A more detailed description of the manner in which the blades are secured to the drum is given in the specification accompanying the applicant's co-pending patent application No. 276,779, now U.S. Patent No. 3,120,277 granted February 4, 1964.

Rings of axially-spaced stator blades 15, secured to the inside of the casing members 16, are interposed between the rings of rotor blades 14. A passageway 17 extends radially from the periphery to the hollow interior of the drum 12 through which passageway compressed air can be bled off for cooling and other purposes. A second passageway 18 in the drum 12 permits a part of this air to pressurise the space between the bearing in the housing 13 and the upstream end face of the drum 12 to produce a thrust force tending to counterbalance the thrust force of the drum 12 on the bearing.

The diffuser 5 which is of a length sufficient to produce the required deceleration of the air leaving the compressor is defined by two spaced apart generally annular walls 5a and 5b, terminating in air-guiding beads 5c and 5d, respectively, disposed around the downstream end of the compressor 1. These walls 5a, 5b together with one of the casing members 16 and a wall 6a define the annular collecting chamber 6 which has an annular outlet 19 sub-divided by supports 20 extending between the walls 5b and 6a. The collecting chamber 6 has a second outlet 21 opening into a conduit 22 flanged at its free end to receive either a closure member 23 as shown in FIGURE 2 or further ducting leading, for example, to the heat-exchanger 9 as shown in FIGURE 1.

The outlet 19 leads into a chamber 24 of generally annular shape containing the turbine inlet volute 7, both of which are arranged around the axis of the plant. The chamber 24 has an outlet 24a (FIGURE 1) through which compressed air can flow into the combustion chamber 8 containing a flame tube 8a. The combustion products from the flame tube 8a enter the volute 7 through an outlet co-axial with the outlet 24a. An annular outlet 7a of the volute 7 permits the combustion products to flow to the turbine assembly 3.

When the plant is in operation air at a high pressure but low velocity is collected in the collecting chamber 6. This air leaves the chamber 6 through the outlet 19 as a continuous, axially directed, annular stream and enters the chamber 24 where, as indicated by the arrows, a part of it flows to the combustion chamber 8 through the outlet 24a and the remainder flows to the turbine assembly 3 for cooling purposes. In addition, air may be taken from the chamber 6 through outlet 21, the state of the air within the chamber 6 enabling this to be done simply and with a minimum of duct losses.

Hence a gas turbine plant according to the invention may be readily converted from operation without a heat exchanger to operation with a heat exchanger and vice versa. If it is desired to incorporate a heat exchanger in the plant the plate 23 (FIGURE 2) is removed and the inlet of the cold pass of the heat exchanger 9 (FIGURE 1) is connected to the conduit 22. The outlet 9a of the cold pass is placed in communication with the combustion chamber 8 through a manifold 9b and the hot pass is arranged to receive turbine exhaust gases in known manner. To ensure that air will flow to the combustion chamber 8 via the heat exchanger 9 a modified flame tube is substituted for that employed when the plant is operating without a heat exchanger. The modified flame tube has an annular baffle 8b (shown in broken lines) adjacent its outlet which, when the flame tube is located in the combustion chamber 8, extends from the outer wall of the flame tube to the inner wall of the combustion chamber thus preventing air entering the combustion chamber from the chamber 24.

In operation air for combustion flows to the combustion chamber 24 via the outlet 21 and the heat exchanger 9 while air for cooling the turbine assembly 3 continues to flow through the annular outlet 19.

It will be seen that at all times a continuous, annular stream of air leaves the collecting chamber 6 through the outlet 19 although the quantity may vary depending upon whether air is also being removed from the chamber 6 through the outlet 21.

The turbine assembly assembly 3 comprises a high-pressure turbine constituted by a ring of stator blades 25 and a rotor disc 26 carrying a ring of blades 27 in its periphery, and a low-pressure turbine similarly constituted by a ring of stator blades 28 and a rotor disc 29 with a ring of blades 30. The outer platforms of the stator blades 25, 28 form, with ring elements 31, 32 with which they inter-engage, the inner wall of the outer casing of the turbine assembly 3. The ring elements 31, 32 act as stationary shrouds for the blades 27, 30 respectively, and are each constructed from a number of segments to permit circumferential expansion. Pairs of ribs 25a, and 25b, 28a and 28b extend radially outwardly from the outer platform of each of the stator blades 25, 28. The upstream rib 25a, 28a of each pair is formed with a flange 25c, 28c respectively, which engages in an annular recess cut in the associated one of a pair of annular members 33, 34. The downstream rib 25b, 28b of each pair engages the radially inner surface of the associated member 33, 34 to prevent the blades 25, 28 tilting (in an anti-clockwise direction as viewed in the drawings) about their respective flanges 25c, 28c. The members 33, 34 and a further annular member 35 securely lock the blades 25, 28 and the ring elements 31, 32 together and in addition form the outer wall of the casing of the turbine assembly 3. An annular strengthening wall 39 is secured at one end to a flange 37 on a part 38 of the casing of the plant and at the other end to the turbine inlet volute 7. A further annular strengthening wall 39a is secured at one end to the member 39 and at the other end terminates in an enlarged portion abutting the annular member 33. The wall 39a and a part of the member 39 define with the members 33, 34 an annular space 39b and to permit cooling air to enter this space from the annular chamber 24 passages 36 are formed in the flange 37. A dished annular plate 38a is secured to the flanged portion 37 to act as a heat shield and to guide the cooling air to the passageways 36. Passageways 33a and 34a formed in the members 33 and 34, respectively, permit this cooling air to flow from the space 39b into the annular spaces between the members 33, 34, the blade platforms and the ring elements 31, 32. Light guage metal hoops 40 clamped between the engaging faces of the members 33, 34 and the ribs 25b, 28a of the outer platforms of the stator blades 25, 28 are provided to direct air flowing through the passageways 33a, 34a along the radially inner faces of the members 33, 34. Cooling air is also permitted to leak from the space 39b between the abutting surfaces of the annular member 33 and the wall 39a and finally to join with the combustion products at the volute outlet 7a. The end of a conduit 41 is secured at an opening in the member 35 to permit cooling air to be supplied, at a pressure lower than that at the passageways 36, to an annular space 42 between the member 35 and parts of the member 34 and the ring element 32. Ports 43 in the member 34 permit air to flow from the annular space 42 into the annular space between the member 34 and the outer platform of the stator blade 28. A hoop 44, similar to the hoops 40, is provided to direct the air along the radially inner surface of the member 34. The cooling air entering by passageways 36 and conduit 41 is finally permitted to leak between the outer platforms of the stator blades to mix with the combustion products leaving the volute outlet 7a.

Provision is made to supply some of the relatively cool air within the chamber 24 to the periphery of the rotor disc 26 and the roots of the blades 27 fixed therein. The annular space defined between the diffuser wall 5b and the adjacent upstream wall of the volute 7, which is covered with a layer 45 of heat-insulating material, guides cool air to an annular structural member 47 having a plurality of passageways 46 (only one shown) therein to direct the air on to the periphery of the disc 26. The disc 26 is bounded on one side by a wall structure 48 secured to the inner platform of the stator blade 28 and on the other side by a wall 49 secured at its periphery to the structural member 47 and at its centre to a bearing housing 50. Similarly, the rotor disc 29 is bounded on one side by the wall structure 48 and on the other side by a wall (not shown) similar to the wall 49. An air-metering aperture 48a is formed substantially centrally of the wall structure 48. A number of apertures 49a are formed in the wall 49 to permit air to pass from the space surrounding the bearing housing 50 to the upstream face of the disc 26. The disc 26 is secured to an extension 51 of the shaft 2 by means of a hollow bolt 52. The bolt is formed at one end 52a with a screw-thread of a given pitch to engage with a screw-thread of the same pitch cut in a bore drilled in a plate 53 secured to the extension 51. The other end 52b of the bolt 52 is also screw-threaded but with a screw-thread of a pitch different from that of the bolt-end 52a so that when the bolt-end 52a is screwed into the plate 53, the disc 26 placed on the free end of the bolt 52 and an appropriately screw-threaded nut 54 screwed on to the bolt-end 52b the difference in the pitches of screw-threads at each end of the bolt 52 gives a mechanical advantage which permits the assembly to be drawn tightly together. A tab-washer 55 engages the head of the bolt 52 and the nut 54 to prevent relative movement between them. The mating surfaces of the disc 26 and the shaft extension 51 are formed with inter-engaging teeth 56 which besides preventing relative motion between the disc 26 and the extension 51 also locates the disc 26 co-axially of the extension 51.

The extension 51 of the shaft 2 is journalled in a plain bearing 57 contained within the housing 50 which comprises a wall 58, constituted by a radially inwardly extending portion of an axial extension 59 of the wall 5b, and a wall 60 secured to the extension 59 but spaced therefrom by a bearing-supporting member 61 and its cap 61a. Labyrinth seals 62 seal the gap between the inner peripheries of the walls 58, 60 and the shaft extension 51. The bearing 57 is formed in two parts, a lower part carried by struts 63 integral with the member 61 and an upper part secured to the lower part in known manner by bolts (not shown). Oil deflector plates 64 are secured to the bearing 57 by set-screws 65. A passageway 66 communicates with the interior of the housing 50 to provide a drain for excess air and lubricant collected therein and with a pressurised chamber (not shown) where the air and lubricant are separated from each other, the latter then being returnable to a non-pressurised sump for re-use. Passageways 67 in the extension 59 and the ports 49a in the wall 49 permit the free flow of air about the housing 50 thereby ensuring that the external air pressure on each of the labyrinth seals 62 is substantially the same. By means of the pressurised chamber the interior of the housing 50 is maintained at a pressure slightly lower (say 1 p.s.i.) than that outside the housing so that leakage of lubricant from the interior of the housing past the seals is reduced to a minimum.

A gland 68 disposed around the shaft 2 comprises a two-part annular housing secured to the wall 5b and containing two pairs of semi-annular carbon brushes 69, 70 mounted to have a limited radial movement. The brushes 69, 70 are held firmly in contact with the shaft 2 by springs (not shown).

When the plant is in operation the gland 68 controls the quantity of cooling air entering the space around the bearing housing 50, this air flowing through the passageways 67 and apertures 49a to cool the upstream face of the disc 26 before passing between the periphery of the latter and the inner platforms of the stator blades 25 into the hot gas stream. A part of the air bled from the compressor 1 through the pasageway 17 flows through the hollow bolt 52, the other part pressurising the bearing 13 as previously described. Of the air leaving the bolt 52 some flows through the metering aperture 48a to flow over and cool the upstream face of the disc 29 while the remainder flows over and cools the downstream face of the disc 26 before finally escaping into the hot gas stream.

I claim:

1. A gas turbine plant including an axial flow compressor, a diffuser to receive gas from the compressor, a first annular chamber to collect the compressor gas, a second annular chamber, both annular chambers being arranged about the compressor axis, the first annular chamber having an annular outlet through which a continuous annular stream of gas can flow to the second annular chamber and another outlet, a combustion chamber associated with the second annular chamber and comprising a casing and a flame tube contained therein, a turbine inlet volute disposed co-axially within the second annular chamber and a turbine, the second annular chamber having an opening therein through which the flame tube and the turbine inlet volute are connected whereby the products of combustion are delivered to the turbine, said opening in the second annular chamber also permitting compressor gas to flow from the second chamber to the combustion chamber.

2. A gas turbine plant according to claim 1, incorporating a heat exchanger having a hot pass and a cold pass, the hot pass being in communication with the turbine exhaust gases and the cold pass placing said other outlet of the first annular chamber in communication with the combustion chamber.

3. A gas turbine plant according to claim 2, wherein a baffle means is provided to restrict the flow of compressor gas from the second chamber to the combustion chamber.

References Cited by the Examiner

UNITED STATES PATENTS 2,633,705  4/1953  Hawkins _____ 60—39.36

FOREIGN PATENTS 604,114  6/1948  Great Britain.
634,554  3/1950  Great Britain.

MARK NEWMAN, *Primary Examiner.*

CARLTON R. CROYLE, *Examiner.*

RALPH D. BLAKESLEE, *Assistant Examiner.*